UNITED STATES PATENT OFFICE.

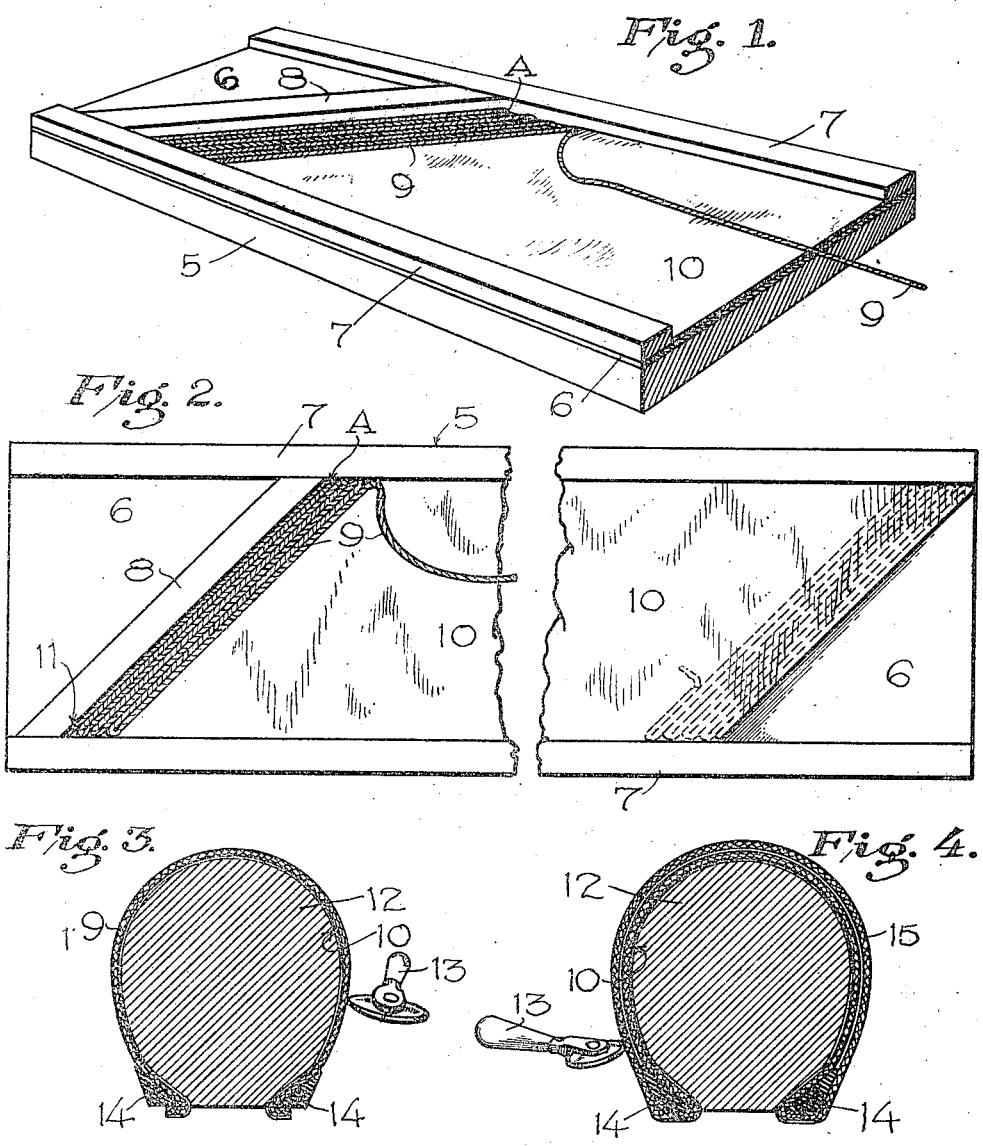

EDWARD NALL, OF AKRON, OHIO, ASSIGNOR TO THE GOODYEAR TIRE AND RUBBER COMPANY, OF AKRON, OHIO, A CORPORATION OF OHIO.

METHOD OF AND APPARATUS FOR BUILDING UP CORD BLANKETS FOR PNEUMATIC TIRES.

1,317,664.   Specification of Letters Patent.   Patented Sept. 30, 1919.

Application filed July 10, 1916. Serial No. 108,403.

*To all whom it may concern:*

Be it known that I, EDWARD NALL, a citizen of the United States, residing at Akron, in the county of Summit and State of Ohio, have invented new and useful Improvements in Methods of and Apparatus for Building up Cord Blankets for Pneumatic Tires, of which the following is a specification.

My present invention relates to methods for building up cord carcasses for pneumatic tires and, in particular, relates to a novel method for laying up cord blankets to form the plies of the carcass.

One of the well known methods of building cord tires in accordance with the present day practice is to build cord blankets by laying cords side by side and in parallelism to each other, and subsequently forming the blankets as the plies of a tire upon a ring core into the proper shape, suitable gum strips being provided to maintain the cords in the position laid up, and to form, upon vulcanization, a resilient union between adjacent cords of the same ply. The method usually followed is to wind a continuous cord backward and forward between two spaced parallel sets of pins or other retaining members, so that the cord is looped about successive pins to provide parallel lengths forming a blanket. When the blanket is applied to the core upon which the carcass is to be built up, bead wires are usually run through the cord loops on each side of the core, and joined at their extremities to form the beads for the toes of the finished tire. In many cases, ingenious attempts have been made to facilitate the laying up of the cord into its blanket by providing a frame equipped with removable pins so that the blanket may be readily taken from the frame when it is desired, to pass the bead wires through the cord loops and to apply the blanket upon the tire.

Two faults of this practice may be noted in the facts that it is not possible to provide an endless bead where a wire is strung through the lateral loops of the blanket and that the apparatus necessitated for laying up the blanket with speed and uniformity is relatively complicated and costly.

Being cognizant of the conditions above stated, I contemplate herein the provision of a method of laying up cord blankets which does not necessitate the use of a bead wire nor require a splicing of the bead to be used, while at the same time employing to this end an apparatus reduced to its simplest and cheapest terms.

A principal object of the invention is to produce a cord blanket by laying the cord in a sheet of raw gum in such a manner that the cord portions are doubled upon themselves and contact in parallelism without the necessity of any retaining means engaging the loop portions of the cord passes.

A further object of the invention is to provide means whereby the blanket may be gaged to an accurate width and whereby the desired bias angle of both the cords and the ends of the blanket may be as readily attained, without the necessity of separate measurements for each blanket laid up.

Another object of primary importance is to provide a method wherein cord blankets forming the plies of the tire carcass may be securely anchored upon non-extensible beads which are not applied to the blanket plies until the carcass is being laid up upon its core.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a partial perspective view of a cord blanket as initiated in accordance with the method of the present invention;

Fig. 2 is a fragmentary plan view of the same subject matter; and

Figs. 3 and 4 are transverse sectional views taken through the laid-up core showing the application of successive plies to the core and the anchorage of the plies upon the beads.

The apparatus employed in the present invention, aside from the hand tools of the workmen and in addition to the customary collapsible ring core upon which the tire carcass is finally laid up, consists simply of a table 5, illustrated in Figs. 1 and 2. The table is of a greater over-all length than the circumference of the cord blanket when the latter is linearly stretched out. Supports of a suitable nature, which need no specific illustration, erect the table 5 into a position handy for the workmen. The top of the table is covered with a sheet of zinc 6 or some equivalent affording a smooth surface and one from which the raw gum of each blanket may be readily detached.

Side rails 7 are secured upon the top of the table 5 in a parallel spaced relation that delineates between the rails the exact width of the cord blanket to be laid up, and a cross-bar 8 connects the side rails at one end of the table in the oblique manner illustrated in Figs. 1 and 2. This cross-bar 8 serves as a guide to determine the bias angle along which the cord passes of the blanket are to be alined in parallelism. This concludes the apparatus necessitated in the practice of the present invention, with the exception of the usual hand tools, the mentioned ring core, and a suitable reel or similar support for a quantity of the cord 9 to be used in fabricating the blanket. Preferably this reel, which is not illustrated, is placed in alinement with the space between side rails 7 of the table, in order that the workman may readily feed off lengths of cord from the reel as he has occasion to use them.

In carrying out the method which I herein propose, the first step is to place a sheet of uncured gum 10 of approximately the correct size, though somewhat larger than the required dimensions upon the surfaced top 6 of a table, such gum being smoothly laid with its side edges adjacent or overlying the respective rails 7 and its forward end edge in contact with the biased bar 8. The workman then trims the sheet of gum to the required dimensions, which is preferably done by using the rails 7 and the bar 8 as straight-edge guides for a trimming knife held by the operator, he next tamps the free end 11 of the cord 9 upon the gum sheet at the vertex of the acute angle made by the bar 8 with the adjacent rail 7. Since the cord employed is preferably made up of a number of smaller cords which are twisted together and coated with a rubberized solution, the adhesion between the cord and the gum sheet 10 is so great as to prevent causal displacement of the cord when it has once been tamped into place.

The cord extremity 11 being thus placed in contact with the bias bar 8, a length of the cord is then finally placed in contact throughout the entire length of the bar until it intersects the opposite rail 7, at which time the workman makes a loop in the cord as at A and lays a second length in contact with that just placed against the bar 8. This process is continued by making alternate loops at every meeting of a cord length with one of the rails 7, until the entire sheet of gum 10 is covered by parallel cords which are firmly embedded in their position and all of which make similar angles to the sides of the blanket in accordance with the guide 8.

The tool employed by the workmen when laying the cord lengths upon the gum sheet 10 in fabrication of the blanket may conveniently consist of a bar having a spatulate extremity although this has not been illustrated. With such an implement held in contact with the cord length by one hand while the other hand presses the cord upon the gum in proper alinement with its fellows, great rapidity may be secured without injury to the produced blanket.

When the laying up process of the blanket has been concluded, it may very readily be removed from the table without the necessity of detaching any fastening means or of inserting bead wires through the cord loops in order to prevent the individual cords of the blanket from becoming mutually displaced, as the gum sheet 10 is ample prevention of this fault. The blanket thus produced is now placed with its longitudinal center line in coincidence with that of the ring core 12 so that the lateral edges of the blanket engage the sides of the core and depend equally therebelow.

Prior to the placing of the cord blanket upon the core it may be found desirable to cut off the loops formed by the bends made in the cord lengths at the edges of the gum sheet 10 since these portions of the cord must be crowded along the smaller inner diameter of the core 12, a condition materially interfered with by the excess bulk of the cord loops.

After the blanket has been initially adjusted upon the core the side walls provided thereby are stitched into place by use of the familiar tool 13 shown in Figs. 3 and 4, or through the medium of a suitable mechanical stitcher. The cord edges from which the loops have just been cut are then bent outwardly below endless beads 14 which may next be applied to the blanket edges of respective side walls. If desired, the lapped faces of the beads may be provided with strips of green or semi-green gum to anchor the rough edges of the cord blanket thereto, such edges being bent outwardly to inclose the beads with their cords at angles reduced from the bias angle of the cords forming the tread and side walls proper of the tire.

The second ply of cords is laid up upon the table 5 in the manner already described, although being of a slightly increased length, and is similarly built into the carcass upon the core 12, with the cords preferably at right angles to those of the preceding ply. When placed upon the core 12 the second blanket 15 is also stitched down while the lateral edges of the blanket are bent under the beads 14 in a direction opposite to that of the bent edges of the first cord blanket, although similarly thereto the cords in the bent edges lying at an angle to their bias position in the tread and side walls. Any suitable method such as the bending of a gum strip about the beads and the lapping blanket edges thereof may be resorted to to fortify the toes of the tire against disruption into their component parts.

From the preceding description, it will be apparent that a method and means for laying up cord carcasses for pneumatic tires have been disclosed herein in attainment of the foregoing objects of my invention. I desire it recognized, however, that such additional refinements may take place in the practice of the invention in later embodiments thereof as shall come within the scope of the claims appended hereto.

One such refinement of the disclosed method may be instanced in the dispensation with the gum strip described as forming the basis of the cord blanket proper. The cords themselves are rubberized and are sufficiently "tacky" to adhere to each other when laid up upon the table. I have discovered that a cord blanket made in accordance with the method discussed in the foregoing but with the omission of the gum sheet maintains its built-up form to such a degree that the omission of the gum sheet forms no bar to the fabrication of a carcass from the cord plies or strip. Additional refinements and adaptations of a like nature of the principles disclosed herein are similarly comprehended by the invention.

What I claim is:

1. That method of laying up a cord blanket for a tire casing comprised in the following steps: (a) the trimming of a flat sheet of gum to the desired size and shape of the blanket; and (b) the laying up of a continuous cord upon the blanket in such a manner that successive lengths of the cord are doubled back upon themselves at opposite edges of the gum sheet, all of the doubled lengths of said continuous cord being embedded in the surface of said gum sheet.

2. That method of constructing a cord blanket for use in the fabrication of a tire casing comprised in the following steps: (a) the trimming of a sheet of uncured gum stock to the exact shape of the finished blanket, the ends of the gum sheet being at a bias angle to the lateral edges thereof; and (b) the laying of a continuous cord in lengths extending from one lateral edge of the gum sheet to another, successive lengths being doubled upon the preceding lengths, and all of said cord lengths being embedded in parallelism to the bias angle furnished by the ends of the gum sheet.

3. That method of constructing a cord blanket for use in the fabrication of a tire casing comprised in the following steps: (a) the trimming of a gum sheet to predetermined dimensions; (b) the laying up of a continuous cord in successive lengths extending from one lateral edge of the gum sheet to the other, each successive length of the cord being doubled upon the preceding length at the adjacent edge of the gum sheet; and (c) the trimming of the sides of the cord blanket, thus produced, to remove the loops of the cords.

4. That method of manufacturing cord tire casings comprised in the following steps: (a) the cutting of a gum sheet to the exact size of respective plies of the carcass; (b) the laying up of a continuous cord transversely upon each gum sheet from edge to edge thereof, each length of the continuous cord being doubled back upon the preceding length and in parallelism thereto; (c) the winding of one or more finished blanket plies peripherally on a core; (d) the application of an endless bead to the blanket plies on the core; and (e) the folding of the edge portion of the blanket plies about the base of the bead.

5. As an apparatus for laying up annular blankets for cord tires, a table; side walls spaced at a distance equal to the width of the finished blanket; and a bias guide bar extending at an angle between opposite side rails whereby the bias angle of the cords composing the blanket may be determined.

6. The method of laying up a cord blanket for a tire casing, which consists in laying a continuous cord, previously coated with an adhesive, in successive lengths, doubled upon each other, and in parallelism, by pressing each length as it is laid firmly against the preceding one so that it will adhere thereto throughout its entire length, thus forming alined closed loops at both edges, the lines formed by the loops at both edges being parallel to each other and oblique to the lengths of the cord.

7. That method of constructing a cord blanket for a tire casing, which consists in laying up lengths of a continuous cord upon a sheet of uncured gum, and simultaneously pressing said lengths into said gum, the successive lengths being doubled back each against the preceding one.

In testimony whereof I have signed my name in the presence of two subscribing witnesses.

EDWARD NALL.

Witnesses:
LELA WAGNER,
C. V. P. NEWBOLD.